US012739210B1

(12) United States Patent
Blich et al.

(10) Patent No.: US 12,739,210 B1

(45) Date of Patent: Sep. 15, 2026

(54) DUAL LOOKUP AND DUPLICATE DISCARD ENGINE IN A NETWORK DEVICE

(71) Applicant: Marvell Israel (M.I.S.L) Ltd., Yokneam (IL)

(72) Inventors: Eran Blich, Kfar Saba (IL); Ilan Yerushalmi, Hod Hasharon (IL); Adar Peery, Aseret (IL); Yuval Peled, Kiryat Ono (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 41 days.

(21) Appl. No.: 19/032,694

(22) Filed: Jan. 21, 2025

Related U.S. Application Data

(60) Provisional application No. 63/622,767, filed on Jan. 19, 2024.

(51) Int. Cl.
*G06F 15/173* (2006.01)
*H04L 45/745* (2022.01)
*H04L 47/32* (2022.01)

(52) U.S. Cl.
CPC ............ *H04L 47/32* (2013.01); *H04L 45/745* (2013.01)

(58) Field of Classification Search
None
See application file for complete search history.

(56) References Cited

U.S. PATENT DOCUMENTS

| | | | | |
|---|---|---|---|---|
| 6,687,247 | B1 * | 2/2004 | Wilford | H04L 47/50 370/392 |
| 6,735,679 | B1 * | 5/2004 | Herbst | H04L 49/103 711/167 |
| 10,015,096 | B1 * | 7/2018 | Singh | H04L 47/11 |
| 12,238,001 | B1 | 2/2025 | Schroder et al. | |
| 2007/0195778 | A1 * | 8/2007 | Tatar | H04L 49/1546 370/469 |
| 2011/0134925 | A1 * | 6/2011 | Safrai | H04L 45/586 370/395.53 |

(Continued)

OTHER PUBLICATIONS

Abdul, A., et al., "Integration of HSR and IEEE1588 over Ethernet networks," Proc. of the 2010 Int'l IEEE Symposium on Precision Clock Synchronization for Measurement, Control and Communication, pp. 77-82 (Sep. 27-Oct. 1, 2010).

(Continued)

*Primary Examiner* — Phuoc H Nguyen

(57) ABSTRACT

A network device is configured in receive regular packets and redundancy protocol packets via network interfaces of the network device. The network device includes a dual lookup and duplicate discard engine configured to, using one or more shared resources, selectively perform different lookup operations for a packet based on whether the packet is a regular packet or a redundancy protocol packet. The dual lookup and duplicate discard engine is configured to, in response to determining that a packet is a regular packet, perform at least one lookup operation to determine one or more network interfaces via which the packet is to be transmitted by the network device and, in response to determining that a packet is a redundancy protocol packet, perform at least one lookup operation to determine whether the packet is a first instance packet or a duplicate packet that is to be discarded by the network device.

18 Claims, 3 Drawing Sheets

(56) References Cited

U.S. PATENT DOCUMENTS

| | | | | |
|---|---|---|---|---|
| 2012/0137075 | A1* | 5/2012 | Vorbach | G06F 12/084<br>711/E12.024 |
| 2014/0301394 | A1* | 10/2014 | Arad | G06F 16/245<br>370/392 |
| 2020/0278893 | A1* | 9/2020 | Niell | G06F 9/4856 |

OTHER PUBLICATIONS

IEC 62439-3, "Industrial communication networks—High availability automation networks—Part 3: Parallel Redundancy Protocol (PRP) and High-availability Seamless Redundancy (HSR)," International Electrotechnical Commission, pp. 1-62 (2010).

Weber, K., et al., "High availability seamless automation ring (Draft IEC 62439-3) and IEEE 1588 time sync dependencies," Institute tor Electrical and Electronics Engineers, Inc, pp. 1-7 (Oct. 2010).

* cited by examiner

DUAL LOOKUP AND DUPLICATE DISCARD ENGINE IN A NETWORK DEVICE

CROSS REFERENCES TO RELATED APPLICATIONS

This application claims the benefit of U.S. Provisional Patent Application No. 63/622,767, entitled "System and Methods Supporting L2 Bridging and HSR & PRP," filed on Jan. 19, 2024, the disclosure of which is hereby expressly incorporated herein by reference in its entirety.

FIELD OF TECHNOLOGY

The present disclosure relates generally to network devices, and more particularly, to network devices that support redundancy in network communications.

BACKGROUND

Communication systems generally use communication networks to interconnect various devices and to enable communication between the various devices. Network devices, such as switches, routers, etc., in the communication network typically are configured to perform forwarding and/or routing of packets based on header information, such as a destination address extracted from a header of a packet. Such forwarding and/or routing operations are typically performed using an engine (e.g., a forwarding or a routing engine) configured to perform lookups in a memory (e.g., a forwarding or a routing database) to determine how to properly forward or route the packets towards packet destinations.

Some network devices support redundancy communication protocols that provide for redundant network communications that ensure high availability, fault tolerance, and zero-downtime communications. Such highly available and fault tolerant communication networks are useful in industrial automation applications, for example. Redundancy communication protocols include, for example, High-availability Seamless Redundancy (HSR) network protocol and Parallel Redundancy Protocol (PRP) network protocol, which are standardized by International Electrotechnical Commission (IEC) 62439-3. According to redundancy communication protocols, multiple copies of a packet are transmitted via separate paths to ensure zero downtime in case of transmission failure via any particular one of the multiple paths. In HSR, a source device in a ring or other mash topology transmits copies of a packet via multiple paths in the ring or mesh topology. In PRP, a source device transmits copies of a packet over separate, parallel, communication networks. In both HRS and PRP, when a network device receives multiple copies of the same packet, the endpoint device accepts a first received copy of the packet and discards any later-received copies of the packet.

Network devices that support redundancy communication protocols such as HSR and PRP typically are configured to detect whether a packet transmitted in accordance with the redundancy communication protocol is a first received instance of the packet or is a duplicate of an already received instance of the packet. Typical network devices that support redundancy communication protocols use dedicated hardware resources, such as lookup dedicated engines and tables, for detecting and discarding duplicate copies of packets. Dedicated hardware resources for detecting and discarding duplicate copies of packets generally increases the cost, complexity, size, power consumption, etc. of a network device as compared to network devices that do not support redundancy communications.

SUMMARY

In an embodiment, a network device includes a network interface processor configured to couple to a plurality of network interfaces, the network interface processor configured to receive regular packets and redundancy protocol packets via respective ones of the network interfaces, the redundancy protocol packets conforming to one or more redundancy network protocols that specify transmission of duplicate packets. The network device also includes a dual lookup and duplicate discard engine coupled to the network interface processor, the dual lookup and duplicate discard engine configured to, using one or more shared resources, selectively perform different lookup operations for a packet based on whether the packet is a regular packet or a redundancy protocol packet. The dual lookup and duplicate discard engine is configured to i) in response to determining that a packet is a regular packet, perform, using the one or more shared resources, at least one lookup operation to determine one or more network interfaces, among the plurality of network interfaces, via which the packet is to be transmitted by the network device, and ii) in response to determining that a packet is a redundancy protocol packet, perform, using the one or more shared resources, at least one lookup operation to determine whether the packet is a first instance packet or a duplicate packet that is to be discarded by the network device.

In another embodiment, a method for processing packets in a network device including receiving packets via network interfaces among a plurality of network interfaces of the network device, and determining whether respective packets, among the packets, are regular packets or redundancy protocol packets, the redundancy protocol packets conforming to one or more redundancy network protocols that specify transmission of duplicate packets. The method also includes selectively processing the packets using a dual lookup and duplicate discard engine of the network device, including i) in response to determining that a first packet, among the packets, is a regular packet, processing the packet using one or more shared resources to determine one or more network interfaces, among the plurality of network interfaces, via which the packet is to be transmitted by the network device or ii) in response to determining that a second packet, among the packets, is a redundancy protocol packet, processing the packet using the one or more shared resources to determine whether the packet is a first instance packet or a duplicate packet that is to be discarded by the network device.

DETAILED DESCRIPTION

Figure 1:
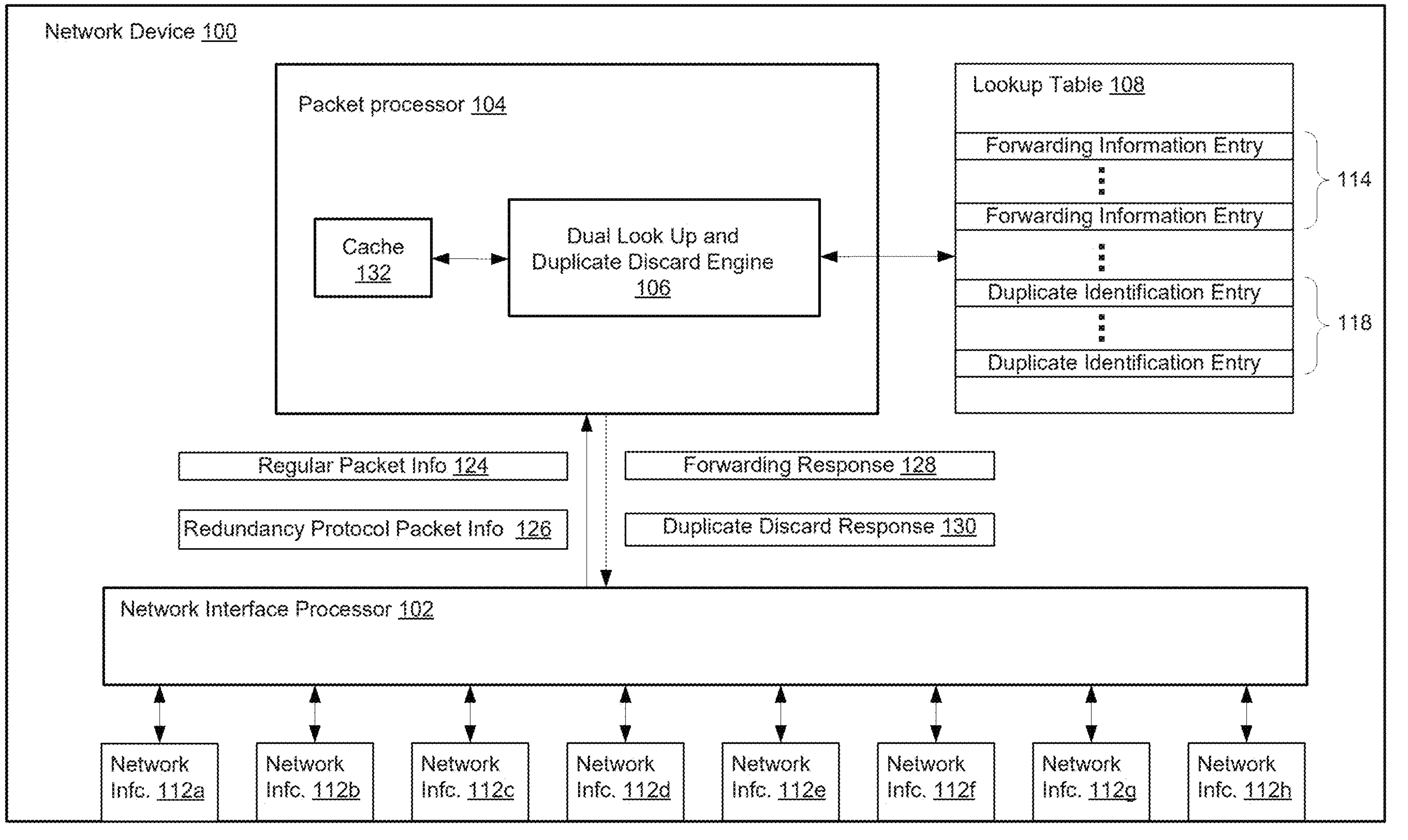
FIG. 1 is a block diagram of an example network device configured to use shared resources for performing operations related to forwarding and/or routing regular packets and detecting duplicates of redundancy protocol packets, according to an embodiment.

In embodiments described below, a network device is configured to support one or more network protocols, such as Ethernet and/or Internet Protocol (IP), in which packets (sometimes referred to herein as "regular packets") are forwarded or routed based on, for example, Layer 2 or Layer 3 destination addresses in headers of the packets. The network device is also configured to support one or more redundancy network protocols, such as one or both of the High-availability Seamless Redundancy (HSR) network protocol and Parallel Redundancy Protocol (PRP) network protocol, in which redundant transmissions are used to ensure high availability, fault tolerance, and zero-downtime communications. According to the redundancy network protocols, a source device transmits multiple copies of packets (sometimes referred to herein as "redundancy protocol packets") via different paths, such that if a fault exists in one of the paths, a destination device still receives a copy of the packet transmitted via another path. As described above, conventional network devices that support redundancy network protocols are configured to use dedicated hardware, such as dedicated lookup engines and lookup tables, for detecting and discarding duplicates of redundancy protocol packets received by the network device. Dedicated hardware for duplicate detection and discard increases the cost, complexity, area, power consumption etc. of a conventional network device that support redundancy network protocols.

In embodiments described below, the network device is configured to use shared resources for performing operations related to forwarding and/or routing regular packets and detecting and discarding duplicates of redundancy protocol packets. For example, in an embodiment, the network device includes a dual lookup and duplicate discard engine that is configured to selectively process packets based on whether the packets are regular packets or redundancy protocol packets received by the network device. For regular packets, the dual lookup and duplicate discard engine is configured to perform lookup operations to make forwarding and/or routing decisions for the packets, in an embodiment. For redundancy protocol packets, the dual lookup and duplicate discard engine is configured to perform lookup operations to determine whether a packet matches stored information that indicates that the packet is a duplicate of an instance of a packet already received by the network device, in an embodiment. In various embodiments, the dual lookup and duplicate discard engine is configured to use one or more of i) a shared data interface configured to transfer packet information (e.g., packet descriptors) associated with both regular packets and redundancy protocol packets, ii) a shared lookup table configured to store information for processing both regular packets and redundancy protocol packets, iii) a shared hash engine configured to generate hash values based on information associated with regular packets and information associated with redundancy protocol packets, and/or iv) a shared match engine configured to determine whether information retrieved from the lookup table matches a key associated with a regular packet or a redundancy protocol packet. In various embodiments, because the network device is configured to use the dual lookup and duplicate discard engine for processing both regular packets and redundancy protocol packets, the complexity, cost, area, power consumption, etc. of the network device are reduced as compared to network devices in which separate dedicated engines are used to make forwarding or routing decisions for regular packets and to detect duplicates of redundancy protocol packets.

FIG. 1 is a block diagram of an example network device 100 configured to use shared resources for performing operations related to forwarding and/or routing regular packets and detecting and discarding duplicates of redundancy protocol packets, according to an embodiment. The network device 100 includes a plurality of network interfaces (e.g., ports) 112 configured to couple to respective network links. The network device 100 also includes a network interface processor 102 coupled to a packet processor 104. The network interface processor 102 is coupled to respective network interfaces 112 and is configured to receive packets received via the network interfaces 112 and to provide packet information (e.g., information extracted from a header and/or a trailer of a packet) to the packet processor 104 for processing of the packet. The packet processor 104 is configured to process the packet to determine one or more actions to be performed with respect to the packet, for example to determine one or more network interfaces 112 via which a packet is to be transmitted by the network device 100, whether the packet should be discarded due to being a duplicate of a packet already received by the network device 100, etc. The packet processor 104 is configured to provide indications of the one or more actions to be performed with respect to a packet to the network interface processor 102 which, in turn, is configured to apply the one or more actions to the packet. For example, the network interface processor 102 is configured to transmit the packet via the one or more network interfaces 112 determined for transmission of the packet by the packet processor 104, to discard the packet according to the determination made by the packet processor 104, etc., in an embodiment.

Although only one network interface processor 102 is shown in FIG. 1, and the one network interface processor 102 is shown as being coupled to the plurality of network interfaces 112, the network device 100 includes multiple network interface processors 102 and each of the multiple network interface processors 102 is coupled to a respective set of one or more network interfaces 112, in some embodiments. The multiple network interface processors 102 may be considered collectively as a single network interface processor.

The network device 100 is configured to support one or more network protocols such as Ethernet and/or Internet Protocol (IP), in which regular packets are forwarded or routed (based on, for example, Layer 2 or Layer 3 addresses in headers of the packets. The network device 100 is also configured to support one or more redundancy network protocols that specify transmission of duplicate packets to ensure high availability, fault tolerance, and zero-downtime communications. In an embodiment, the network device 100 is configured to support one or both of the High-availability Seamless Redundancy (HSR) network protocol and Parallel Redundancy Protocol (PRP) network protocol, which are standardized by International Electrotechnical Commission (IEC) 62439-3. In other embodiments, the network device 100 is configured to support other redundancy network protocols in which redundancy is provided via transmission of multiple copies of a packet. According to the redundancy network protocols, a source device transmits multiple copies of redundancy protocol packets via different paths, such that if a fault exists in one of the paths, a destination device still receives a copy of the packet transmitted via another path. The redundancy protocol packets conform to the one or more redundancy network protocols according to which the redundancy protocol packets are transmitted, in an embodiment. For example, a redundancy protocol packet includes a header tag and/or a packet trailer as specified by the one or more redundancy network protocols. The network device 100 is configured to receive multiple copies of the redundancy protocol packets, to accept and/or forward a first received copy of a redundancy protocol packet, and to discard one or more received duplicates of the redundancy protocol packets, in an embodiment.

In an embodiment in which the network device 100 supports the HSR network protocol, the network device 100 is configured to operate in a ring or other mesh network topology in which multiple paths to a same destination exist through the network. According to the HSR network protocol, for example in the case of a ring network topology, a source device transmits respective copies of a redundancy protocol packet in opposite directions through the ring network. In the absence of a fault in the ring network, the network device 100 receives the multiple copies of the packet via respective network interfaces 112 that are directly coupled to neighboring network devices in the ring network. Thus, for example, the network device 100 receives a first copy of the packet via a first network interface 112 connected to a next device on one side of the ring, and receives a second copy of the packet via a second network interface 112 connected to a next device on the other side of the ring, in an embodiment. In an embodiment in which the network device 100 supports the PRP network protocol, the network device 100 is configured to concurrently operate in multiple separate networks. According to the PRP network protocol, a source device transmits multiple copies of a packet via respective ones of the multiple separate networks. In the absence of a fault in the networks, the network device 100 receives the multiple copies of the packet from the multiple networks. For example, the network device 100 receives a first copy of the packet via a first network interface 112 coupled to a first one of the multiple networks and receives a second copy of the packet via a second network interface coupled to a second one of the multiple networks. In other embodiments, the network device 100 is configured to receive multiple copies of redundancy protocol packets in other suitable manners. When the network device 100 receives multiple copies of a redundancy protocol packet, the network device 100 is configured to accept and/or forward the first received instance of the redundancy protocol packet and to discard one or more received duplicates of the redundancy protocol packet, in an embodiment.

In an embodiment, the network device 100 is configured to determine whether a received redundancy protocol packet is a first instance packet or a duplicate of an already received instance of the packet based on a combination of a source address and a sequence number included in the packet. In an embodiment, for example in the case HSR network protocol, a sequence number is included in an HSR tag in a header of a packet. In another example, for example in the case PRP network protocol, a sequence number is included in a PRP trailer located at or near the end of the packet. In an embodiment, when a source device transmits copies of redundancy protocol packets, the source device includes a same sequence number in multiple copies of a same redundancy protocol packet. The network device 100 is configured to analyze a source address and a sequence number in a received redundancy protocol packet to determine whether the packet is a first instance of the packet (sometimes referred to herein as “first instance packet”) received by the network device 100 or a duplicate of a packet (sometimes referred to herein as “duplicate packet”) already received by the network device 100. When the network device 100 determines that the packet is a first instance of the packet, the network device 100 stores the source address and the sequence number of the packet in a memory, and uses the saved information to identify and discard one or more duplicates of the packet subsequently received by the network device 100.

Referring still to FIG. 1, in an embodiment, the network interface processor 102 is configured to receive packets received via the network interfaces 112 and to provide the packets, or at least relevant information extracted from or otherwise associated with the packets, to the packet processor 104 for processing of the packets. In some embodiments, the network interface processor 102 is configured to, for each of multiple packets, generate a packet descriptor corresponding to the packet and to provide the packet descriptor, instead of the packet itself, to the packet processor 104 for processing of the packet. The packet descriptor associated with a packet includes information extracted from a header and/or a trailer of the packet and, optionally, control information, such as an indication of a network interface 112 via which the packet was received.

The information that the network interface processor 102 is configured to provide to the packet processor 104 for processing of a packet depends on whether the packet is a regular packet or a redundancy protocol packet, in an embodiment. For example, for regular packets, the the network interface processor 102 is configured to provide, to the packet processor 104, regular packet information (e.g., a packet descriptor corresponding to a regular packet) 124. The regular packet information 124 includes at least destination address information (e.g., destination MAC address, destination IP address, etc.), VLAN ID information, etc., from a header of the packet for forwarding or routing of the packet. For redundancy protocol packets, the network interface processor 102 is configured to provide, to the packet processor 104, redundancy packet information (e.g., a packet descriptor corresponding to a redundancy protocol packet) 126. The redundancy packet information 126 corresponding to a redundancy protocol packet includes at least a sequence number that uniquely identifies the redundancy protocol packet, in an embodiment. In an embodiment, the redundancy packet information 126 includes at least a source address and a sequence number, where a combination of the source address and the sequence number uniquely identifies the packet. In some embodiments, the redundancy packet information 126 additionally includes information for transmission of the redundancy protocol packet, such as a forwarding bitmap identifying one or more network interfaces 112 via which the packet is to be transmitted if the packet is a first received instance of the redundancy protocol packet. As explained in more detail below, the network interface processor 102 subsequently uses the packet forwarding information to transmit the packet via the one or more network interfaces 112 if the packet is determined to a first received instance of the redundancy protocol packet, in an embodiment.

In an embodiment, the packet processor 104 is configured to process the packets based on information (e.g., the packet descriptors) associated with the packets. The packet processor 104 includes a dual lookup and duplicate discard engine 106 that is coupled to (or includes) a lookup table 108. The dual lookup and duplicate discard engine 106 is configured to perform lookups in the lookup table 108 based on information included in the packet descriptors associated with packets to determine processing actions to be performed with respect to the packets. In an embodiment, the dual lookup and duplicate discard engine 106 is configured to selectively perform different lookup operations for packets based on whether the packets are regular packets or redundancy protocol packets. For example, for regular packets, the dual lookup and duplicate discard engine 106 is configured to perform lookup operations based on packet header information to determine network interfaces 112 via which the regular packets are to be transmitted. On the other hand, for redundancy protocol packets, the dual lookup and duplicate discard engine 106 is configured to perform lookup operations based on packet header and/or trailer information to determine whether a redundancy protocol packet is a first instance packet received by the network device 100 or a duplicate of a packet that was already received by the network device 100, in an embodiment.

The dual lookup and duplicate discard engine 106 is configured to perform the lookup operations using shared resources (e.g., hardware components) for both regular packets and redundancy protocol packets. For example, as explained in more detail below, the dual lookup and duplicate discard engine 106 is configured to use one or more of i) a shared data interface configured to transfer packet information (e.g., packet descriptors) associated with both regular packets and redundancy protocol packets, ii) a shared lookup table configured to store information for processing both regular packets and redundancy protocol packets, iii) a shared hash engine configured to generate hash values based on information associated with regular packets and information associated with redundancy protocol packets, and/or iv) a shared match engine configured to determine whether information retrieved from the lookup table matches a key associated with a regular packet or a redundancy protocol packet. In various embodiments, because the dual lookup and duplicate discard engine 106 is configured to use shared resources for processing both regular packets and redundancy protocol packets, the complexity, cost, area, power consumption, etc. of the network device 100 is reduced as compared to network devices in which separate dedicated engines are used to make forwarding or routing decisions for regular packets and to detect duplicates of redundancy protocol packets. Additionally, because the network device 100 is configured to use the dual lookup and duplicate discard engine 106 for processing both regular packets and redundancy protocol packets, applications (e.g., software applications) used by the network device 100 to control forwarding and/or routing and duplicate discard operations of the network device 100 communicate with the dual lookup and duplicate discard engine 106 via a single application interface (API), which further reduces complexity, cost, area, power consumption of the network device 100, in at least some embodiments.

With continued reference to FIG. 1, the lookup table 108 is a shared lookup table stored in a shared memory, in an embodiment. In an embodiment, the lookup table 108 is an exact match lookup table stored in a random access memory (RAM) device, a dynamic random access memory (DRAM) device, or other suitable memory device, for example. In an embodiment, the lookup table 108 is stored in a memory device that is external to the network device 100. For example, the lookup table 108 is a DRAM device provided externally to the network device 100.

The lookup table 108 is configured to store entries for processing both regular packets and redundancy protocol packets, in an embodiment. For example, the lookup table 108 includes entries 114 for storing forwarding information for processing regular packets. As merely an illustrative example, each of at least some of the entries 114 stores a correspondence between a destination address (e.g., MAC address, IP address, etc.) in a header of a packet and a network interface 112 via which the packet is to be transmitted by the network device 100. As just another illustrative example, each of at least some of the entries 114 stores a correspondence between a VLAN ID in a header of a packet and a particular set of one or more network interfaces 112 via which the packet is to be transmitted by the network device 100. The lookup table 108 also includes entries 118 for storing duplicate identification information for processing redundancy protocol packets, in an embodiment. For example, each of at least some of the entries 118 stores at least a sequence number that uniquely identifies a redundancy protocol packet recently (e.g., within a predetermined period of time) received by the network device 100. As another example, each of at least some of the entries 118 stores at least a combination of a source address (e.g., MAC address) and a sequence number, where the combination of the source address and the sequence number uniquely identifies a redundancy protocol packet recently (e.g., within a predetermined period of time) received by the network device 100.

In an embodiment, each of at least some of the entries 114, 118 in the lookup table 208 includes an indicator indicating the type of the entry 114, 118. Thus, for example, i) each of at least some of the entries 114 in the lookup table 208 includes an indicator indicating that the entry 114 is a forwarding entry that stores forwarding information for processing regular packets, and ii) each of at least some of the entries 118 in the lookup table 208 includes an indicator indicating that the entry 118 is a duplicate identification entry that stores duplicate identification information for processing redundancy protocol packets, in an embodiment. The indication of the type of the entry 114, 118 in the lookup table 208 serves as an indication of the type of the packet that matches the entry 114, 118, in an embodiment.

Although the entries 114, 118 are illustrated in FIG. 1 as including respective sets of consecutive entries in the lookup table 108, at least some of the entries 114, 118 are interleaved with each other in the lookup table 108, in some embodiments. In an embodiment, the entries 114, 118 are statically allocated in the lookup table 108 for storing, respectively, forwarding information and duplicate identification information in the lookup table 108. In another embodiment, at least some of the entries 114, 118 are dynamically allocated (e.g., by the dual look up and duplicate discard engine 106) as needed during operation of the network device 100.

The dual lookup and duplicate discard engine 106 is configured to perform lookups in the lookup table 108 to determine actions to be performed with respect to received packets, based on the regular packet information 124 and the redundancy protocol packet information 126 corresponding to the packets. In an embodiment, the dual lookup and duplicate discard engine 106 is configured to generate a key based on information 124, 126 corresponding to a packet. The key includes different information depending on whether the packet is a regular packet or a redundancy protocol packet, in an embodiment. The dual lookup and duplicate discard engine 106 is configured to and to generate one or more hash values for the key to be used to identify an entry 114, 118 in the lookup table 108, in an embodiment. The dual lookup and duplicate discard engine 106 is configured to use a shared hash generator to generate the one or more hash values based on the key regardless of whether the packet is a regular packet or a redundancy protocol packet, in an embodiment. Similarly, the dual lookup and duplicate discard engine 106 is configured use a shared match engine to determine whether the identified entry matches the key, in an embodiment. The dual lookup and duplicate discard engine 106 is configured to determine the action to be performed with respect to a packet based on an entry in the lookup table 108 that matches a key generated for the packet. For example, in connection with processing a regular packet, the dual lookup and duplicate discard engine 106 is configured to retrieve forwarding information from the entry in the lookup table 108 that matches the key generated for the packet, in an embodiment. On the other hand, in connection with processing a redundancy protocol packet, the dual lookup and duplicate discard engine 106 is configured to i) determine that the packet is a duplicate of an already received packet if the dual lookup and duplicate discard engine 106 identifies an entry in the lookup table 108 that matches the key generated for the packet and ii) determine that the packet is a first instance packet if the dual lookup and duplicate discard engine 106 does not identify an entry in the lookup table 108 that matches the key generated for the packet, in an embodiment.

The dual lookup and duplicate discard engine 106 is configured to generate responses 128, 130 in connection with processing the regular packets and the redundancy protocol packets, and to provide the responses 128, 130 to the network interface processor 102 via a shared response interface, in an embodiment. The network interface processor 102 is configured to perform actions with respect to the packets based on the responses 128, 130 received from the dual lookup and duplicate discard engine 106. For example, in connection with processing a regular packet, the dual lookup and duplicate discard engine 106 is configured to generate a response 128 to include forwarding information, such as indications of the one or more network interfaces 112 via which the packet is to be transmitted by the network device 100. Accordingly, the network interface processor 102 is configured to forward the packet to the one or more network interfaces 112 indicated in the response 128 for transmission of the packet, in an embodiment. On the other hand, in connection with processing a redundancy packet, the dual lookup and duplicate discard engine 106 is configured to generate a response 130 to include duplicate discard information, indicating whether the packet is a first instance to be transmitted or a duplicate packet to be discarded by the network device. The duplicate discard information also includes the forwarding bitmap identifying one or more network interfaces 112 via which the packet is to be transmitted if the packet is a first received instance of the redundancy protocol packet, in an embodiment. The duplicate discard information also includes the forwarding bitmap with all bits zeroed out to indicated that the packet is a duplicate packet that is to be discarded, in an embodiment. In other embodiments, the duplicate discard information includes other suitable indications of whether i) the packet is to be accepted and/or transmitted or ii) is to be discarded. The network interface processor 102 is configured to transmit or discard the packet according to the duplicate discard information included in the response 130, in an embodiment.

In an embodiment, the dual lookup and duplicate discard engine 106 includes or otherwise implements various mechanisms that allow the dual lookup and duplicate discard engine 106 to process redundancy protocol packets at line rate. For example, the dual lookup and duplicate discard engine 106 is configured to determine that a redundancy protocol packet is a duplicate packet even when the redundancy protocol packet is received very quickly (e.g., within one or two clock cycles) after reception of the first instance of the packet, in an embodiment. However, it may take a longer time (e.g., tens of clock cycles) to write the duplicate identification corresponding to the first instance of the packet to the lookup table 108, in an embodiment. The dual lookup and duplicate discard engine 106 is thus coupled to (or includes) a cache memory 132, in an embodiment. The cache memory 132 is smaller than the lookup table 108, in an embodiment. For example, the cache memory 132 is configured to store a limited number of entries (such as, for example 16 entries) for storing duplicate identification information of most recently (e.g., within a predetermined number of clock cycles) received redundancy protocol packets, in an embodiment. The dual lookup and duplicate discard engine 106 is configured to write duplicate identification information of most recently (e.g., within a predetermined number of clock cycles) received redundancy protocol packets to both the lookup table 108 and the cache memory 132, in an embodiment. The duplicate identification information stored in the cache memory 132 is used by the dual lookup and duplicate discard engine 106 to identify duplicates of the redundancy protocol packets that are received within the predetermined number of clock cycles from reception of the first instance of the packet, when such duplicate identification information is not yet available in the lookup table 108, in an embodiment. These and other techniques described herein allow the dual lookup and duplicate discard engine 106 to perform processing of redundancy protocol packets sufficiently quickly while still using shared resources for processing regular packets and redundancy protocol packets, in at least some embodiments.

Figure 2:
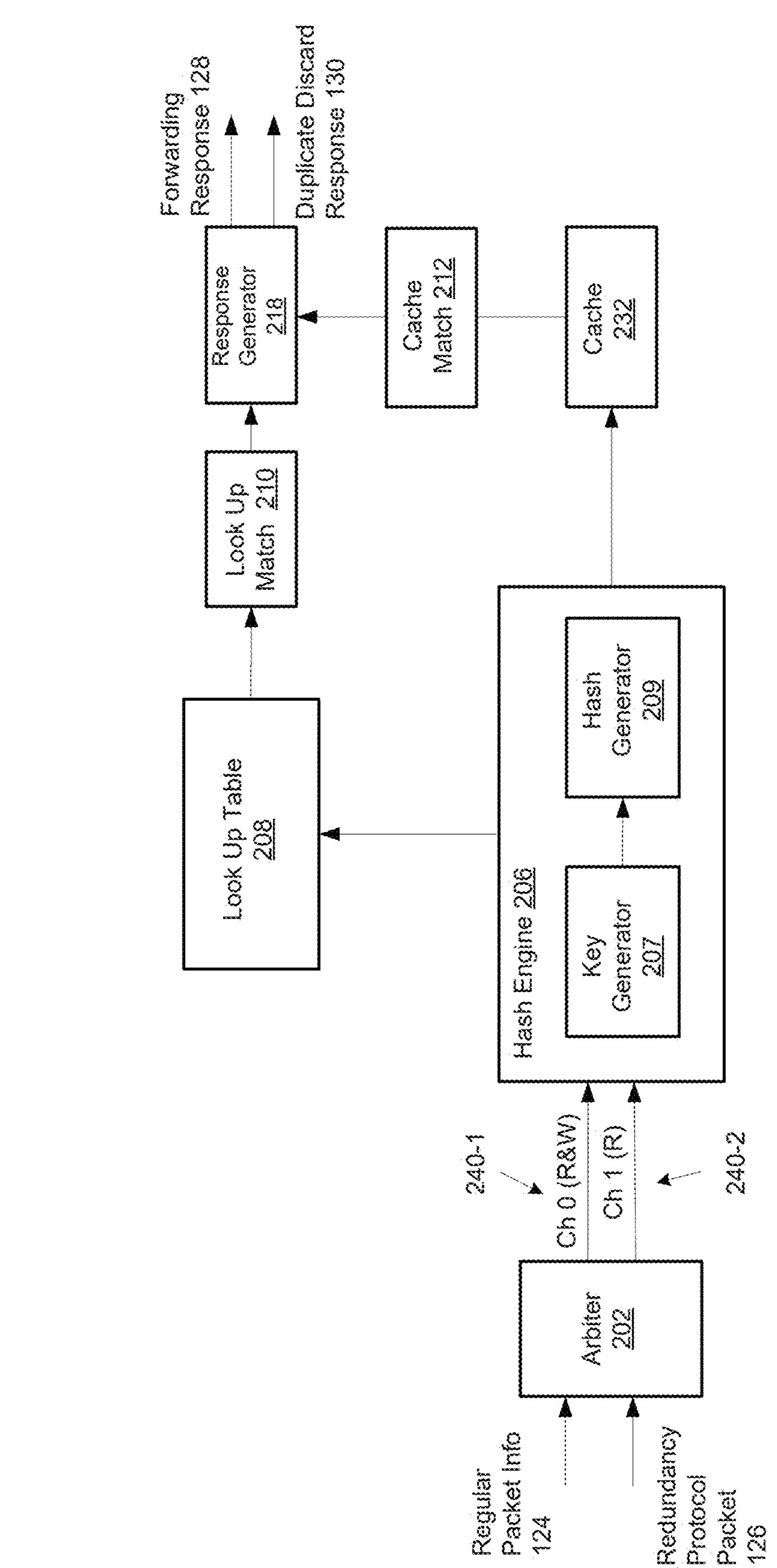
FIG. 2 is a block diagram of a dual lookup and duplicate discard engine used with a network device that supports one or more redundancy network protocols, according to an embodiment.

FIG. 2 is a block diagram of a dual lookup and duplicate discard engine 200 used with a network device that supports one or more redundancy network protocols, according to an embodiment. In an embodiment, the dual lookup and duplicate discard engine 200 corresponds to the dual lookup and duplicate discard engine 106 of the network device 100 of FIG. 1, and the dual lookup and duplicate discard engine 200 is described below with reference to FIG. 1 for ease of explanation. In other embodiments, the dual lookup and duplicate discard engine 200 is used with a network device different from the network device 100 of FIG. 1. Similarly, the dual lookup and duplicate discard engine 106 of the network device 100 of FIG. 1 is different from the dual lookup and duplicate discard engine 200, in some embodiments.

The dual lookup and duplicate discard engine 200 includes an arbiter 202 coupled to a shared hash engine 206. The shared hash engine 206 is coupled to a lookup table 208 (e.g., corresponding to the lookup table 108 of FIG. 1) and a cache memory 232 (e.g., corresponding to the cache memory 132 of FIG. 1). The dual lookup and duplicate discard engine 200 also includes a lookup match engine 210, a cache match engine 212, and a response generator 218, in an embodiment. The arbiter 202 is configured to receive regular packet information 124 and redundancy protocol packet information 126 from the network interface processor 102. The arbiter 202 thus provides a shared data path interface for providing the regular packet information 124 and redundancy protocol packet information 126 to the dual lookup and duplicate discard engine 200, in an embodiment. The arbiter 202 is configured to arbitrate between the regular packet information 124 and redundancy protocol packet information 126 to provide the regular packet information 124 or the redundancy protocol packet information 126 to the hash engine 206 in any given clock cycle. The arbiter 202 is configured to perform arbitration according to a suitable arbitration scheme. For example, because, in an embodiment, the dual lookup and duplicate discard engine 200 is configured to quickly process redundancy protocol packets to ensure that duplicate packets are properly identified even when the duplicate packets are received soon (e.g., e.g., in the next clock cycle, within two clock cycles, within three clock cycles, etc.) from the receipt of the first instance of the packet, the arbiter 202 is configured to give preference to the redundancy protocol packet information 126, in an embodiment. In other embodiments, other suitable arbitration schemes are used.

The hash engine 206 includes a key generator 207 and a hash generator 209. The key generator 207 is configured to generate a key for a packet based on the information 124, 126 corresponding to the packet. In an embodiment, the key generator 207 is configured to generate the key to include different information based on whether the packet is a regular packet or a redundancy protocol packet. In an embodiment, the key generator 207 is configured to determine whether the packet is a regular packet or a redundancy protocol packet based on whether information provided to the hash engine 206 for the packet is the regular packet information 124 or the redundancy packet information 126 (e.g., including HSR tag information or PRP trailer information). In another embodiment, the arbiter 202 is configured to provide, to the hash engine 206, an explicit indication (e.g., via an internal packet descriptor) of whether the packet is a regular packet or a redundancy protocol packet, along with the regular packet information 124 or the redundancy packet information 126 corresponding to the packet. In an embodiment, the key generator 207 is configured to, in response to determining that the packet is a regular packet, generate the key to include a destination address and/or other information (e.g., VLAN ID) relevant to Layer 2 forwarding or Layer 3 routing of the packet. For example, the key generator 207 is configured to, in response to determining that the packet is a regular packet, select one or more fields, such as a destination address field, a VLAN ID field, etc., from the regular packet information 124, and to include information from the selected one or more fields in the key generated for the packet. The key generator 207 is also configured to, in response to determining that the packet is a redundancy protocol packet, generate the key to includes a source address and a sequence number corresponding to the packet. For example, the key generator 207 is configured to, in response to determining that the packet is a redundancy protocol packet, select a source address field and a sequence number field from the regular packet information 124, and to include information from the source address field and the sequence number field in the key generated for the packet.

The key generator 207 is configured to provide the key to the hash generator 209. The hash generator 209 is configured to generate one or more hash values based on the key. For example, the hash generator 209 is configured to apply at least one hash function to the key to generate at least one hash value based on the key. The dual lookup and duplicate discard engine 200 is configured to use the at least one hash value to perform lookups in the lookup table 208 and/or the cache memory 232. The dual lookup and duplicate discard engine 200 is configured to provide information retrieved from an entry identified in the lookup table 208 based on the key to the lookup match engine 210 to determine whether the information matches the key, in an embodiment. Similarly, the dual lookup and duplicate discard engine 200 is configured to provide information retrieved from an entry identified in the cache memory 232 based on the key to the cache match engine 212 to determine whether the information matches the key, in an embodiment.

In some embodiments, the hash generator 209 is configured to apply multiple hash functions to the key to resolve hash collisions. In an embodiment, the hash generator 209 is configured to use up to a certain number (e.g., 16) hash functions to resolve up to 16 hash collisions. In an embodiment, the dual lookup and duplicate discard engine 200 is configured to perform specific lookup operations based on the type of the packet. For example, for a regular packet, the dual lookup and duplicate discard engine 200 is configured to perform the lookup only in the lookup table 208 to determine whether the lookup table 208 has an entry that matches the key. On the other hand, for a redundancy protocol packet, the dual lookup and duplicate discard engine 200 is configured to perform concurrent lookups in the cache memory 232 and the lookup table 208 to determine whether one of the cache memory 232 or the lookup table 208 has an entry that matches the key. In an embodiment, when the dual lookup and duplicate discard engine 200 does not identify a matching entry in either the cache memory 232 or the lookup table 208 that matches the key, the dual lookup and duplicate discard engine 200 determines that the redundancy protocol packet is a first instance of the packet received by the network device 100. In this case, the dual lookup and duplicate discard engine 200 writes the duplicate identification information (e.g., the source address and the sequence number) associated with the packet to the lookup table 208 and to the cache memory 232, in an embodiment.

Information retrieved from a matching entry as determined by either the lookup table match engine 210 or the cache match engine 210 is provided to a response generator 218. The response generator 218 is configured to, based on the type of the packet, generate a response including i) regular packet forwarding information 128 to include forwarding information retrieved from a matching entry in the lookup table 208 or ii) redundancy protocol duplicate discard information 120 determined based on whether a matching entry was identified in either one of the lookup table 208 or the cache memory 232, and to provide the response to the network interface processor 102, in an embodiment.

The arbiter 202 is coupled to the shared hash engine 206 via multiple channels 240, including a first channel (CH 0) 240-1 and a second channel (CH 1) 240-2, in an embodiment. In an embodiment, the arbiter 202 is configured to use the multiple channels 240 to enable read and write operations with respect to a redundancy protocol packet to be performed in a single clock cycle. For example, the arbiter 202 is configured to provide redundancy protocol packet information 126 to the hash engine 206 via CH1 240-2 to allow the hash engine 206 to generate a key based on the redundancy protocol packet information 126. The dual lookup and duplicate discard engine 200 is configured to perform lookups (e.g., concurrent lookups) in the lookup table 208 and the cache memory 232 to identify an entry that matches the key. The arbiter 202 is also configured to, in the same clock cycle, provide the redundancy protocol packet information 126 to the hash engine 206 via CH 0 240-1 to enable the hash engine 206 to generate and hash a key so that the redundancy protocol packet information 126 can be stored in the cache memory 232 if the dual lookup and duplicate discard engine 200 does not find a previously stored entry that matches the key. The arbiter 202 is also configured to, when providing regular packet information 124 to the hash engine 206, provide the providing regular packet information 124 to the hash engine 206 via CH 0 204-1, in an embodiment.

In an embodiment, the dual lookup and duplicate discard engine 200 is configured to use i) a shared data interface configured to transfer packet information 124, 126 associated with both regular packets and redundancy protocol packets, ii) the shared lookup table 208 configured to store information for processing both regular packets and redundancy protocol packets, iii) the shared hash engine 206 configured to generate hash values based on information associated with regular packets and information associated with redundancy protocol packets, and iv) the shared match engine 210 configured to determine whether information retrieved from the lookup table 208 matches a key associated with a regular packet or a redundancy protocol packet. Accordingly, in an embodiment, because the dual lookup and duplicate discard engine 200 is configured to use the shared resources for processing both regular packets and redundancy protocol packets, the complexity, cost, area, power consumption, etc. of the network device 100 are reduced as compared to network devices in which separate dedicated engines are used to make forwarding or routing decisions for regular packets and to detect duplicates of redundancy protocol packets.

Figure 3:
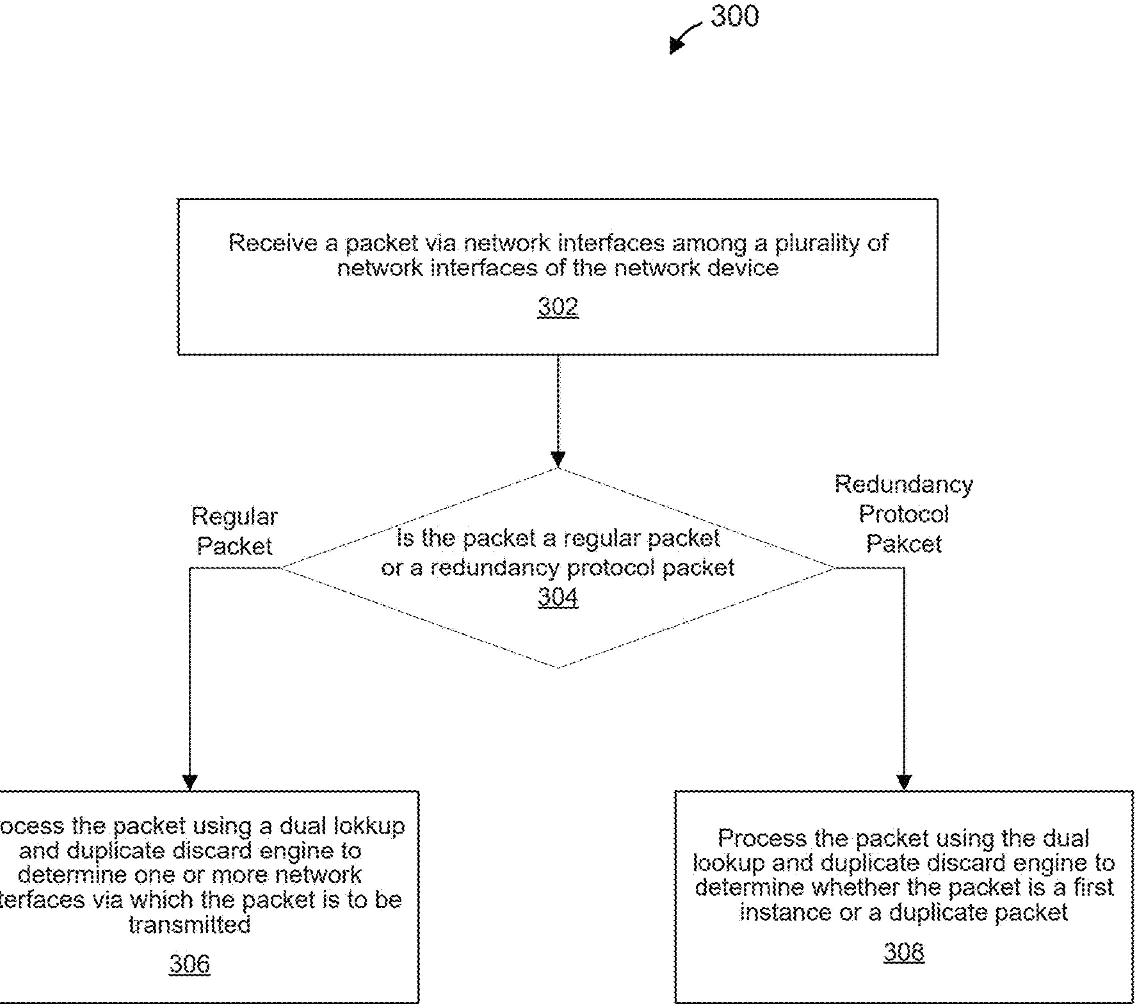
FIG. 3 is a flow diagram of an example method for processing regular packets and redundancy protocol packets in a network device, according to an embodiment.

FIG. 3 is a flow diagram of an example method 300 for processing packets in a network device, according to an embodiment. The method 300 is implemented by the example network device 100, according to an embodiment. The method 300 is described with reference to FIG. 1 merely for illustrative purposes. In other embodiments, the method 300 is implemented by another suitable network device different than the network device 100 of FIG. 1.

At a block 302, a packet is received via a network interface among a plurality of network interfaces of the network device. In an embodiment, the packet is a regular packet, such as a packet to be forwarded or routed by the network device, or a redundancy protocol packet that conforms to a redundancy network protocol, such as the HSR or the PRP network protocol, supported by the network device. At a block 304, it is determined whether the packet is a regular packet or a redundancy protocol packet. For example, it is determined that the packet is a redundancy protocol packet in response to determining that the packet includes at least one of a header tag or a packet trailer that conforms to the redundancy network protocol, in an embodiment. On the other hand, it is determined that the packet is a regular packet in response to determining that the packet does not include the at least one of the header tag or the packet trailer that conforms to the redundancy network protocol, in an embodiment.

If it is determined at the block 304 that the packet is a regular packet, the packet is processed at a block 306 using a dual lookup and duplicate discard engine of the network device. Processing the packet at the block 306 includes using the dual lookup and duplicate discard engine to determine one or more network interfaces, among the plurality of network interfaces, via which the packet is to be transmitted by the network device. In an embodiment, processing the packet at the block 306 includes generating a key based on packet information corresponding to the packet and using a hash engine to apply at least one hash function to the key to generate at least hash value for the packet. Generating the key includes generating the key to include a destination address from a header of the packet, in an embodiment. Processing the packet at the block 306 also includes using the at least one hash value to access a lookup table and to identify an entry in the lookup table that matches the key, where the entry in the lookup table stores a correspondence between the destination address from the header of the packet and one or more network interfaces via which the packet is to be transmitted by the network device.

On the other hand, if it is determined at the block 304 that the packet is a redundancy protocol packet, the packet is processed at a block 308 using the dual lookup and duplicate discard engine of the network device. Processing the packet at the block 308 includes using the dual lookup and duplicate discard engine of the network device to determine whether the packet is a first instance to be transmitted by the network device or a duplicate packet to be discarded by the network device. In an embodiment, processing the packet at the block 308 includes generating a key based on packet information corresponding to the packet and using the hash engine to apply the at least one hash function to the key to generate at least hash value for the packet. Generating the key includes generating the key to include a source address from a header of the packet and a sequence number from a header or a trailer of the packet, in an embodiment. Processing the packet at the block 308 also includes using the at least one hash value to access a cache memory and the lookup table and to determine whether an entry that matches the key exists in the cache memory or lookup table, in an embodiment. When it is determined that an entry that matches the key does not exist in either the cache memory or the lookup table, the dual lookup and duplicate discard engine determines that the packet is a first instance to be transmitted by the network device. Further, the dual lookup and duplicate discard engine writes the source address and the sequence number to the cache memory and the lookup table so that the source address and the sequence number can be used as duplicate identification information to identify a duplicate packet subsequently received by the network device. On the other hand, when it is determined that an entry that matches the key exists in either the cache memory or the look up table, the dual lookup and duplicate discard engine determines that the packet is a duplicate packet to be discarded by the network device, in an embodiment.

In various embodiments, because the dual lookup and duplicate discard engine is used for processing both regular packets and redundancy protocol packets received by the network device, the complexity, cost, area, power consumption, etc. as compared to network devices in which separate dedicated engines are used to make forwarding or routing decisions for regular packets and to detect duplicates of redundancy protocol packets.

At least in some embodiments, because the lookup table stored in the memory includes interleaved entries associated with different packet processing applications, the memory is flexibly shared among the packet processing applications. For example, a new entry for use by any packet processing application among the plurality of packet processing applications can be added to the lookup table as along as memory space is available in the memory shared by the packet processing applications. Moreover, in at least some embodiments, because the network device is configured to maintain a plurality of probabilistic data structures configured to provide indications of rule templates for which matching rules potentially exist in the lookup table, and to apply packet information to multiple probabilistic data structures prior to performing one or more searches in the lookup table such that the searches are limited to only rule templates for which matching rules potentially exist in the lookup table, a memory, such as RAM, that is less expensive in terms of cost, power consumption, occupied area, etc. as compared to a TCAM, is used to store the lookup table with a minimized increase in the number of accesses needed to be performed to identify a matching rule based on packet information in the lookup table.

At least some of the various blocks, operations, and techniques described above are suitably implemented utilizing dedicated hardware, such as one or more of discrete components, an integrated circuit, an application-specific integrated circuit (ASIC), a programmable logic device (PLD), a processor executing firmware instructions, a processor executing software instructions, or any combination thereof. When implemented utilizing a processor executing software or firmware instructions, the software or firmware instructions may be stored in any suitable computer readable memory such a read-only memory (ROM), a random-access memory (RAM), etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:

a network interface processor configured to couple to a plurality of network interfaces, the network interface processor configured to receive regular packets and redundancy protocol packets via respective ones of the network interfaces, the redundancy protocol packets conforming to one or more redundancy network protocols that specify transmission of duplicate packets; and a dual lookup and duplicate discard engine coupled to the network interface processor, the dual lookup and duplicate discard engine configured to, using one or more shared resources, selectively perform different lookup operations for a packet based on whether the packet is a regular packet or a redundancy protocol packet, the dual lookup and duplicate discard engine being configured to:

i) in response to determining that a packet is a regular packet, perform, using the one or more shared resources, at least one lookup operation to determine one or more network interfaces, among the plurality of network interfaces, via which the packet is to be transmitted by the network device, and ii) in response to determining that a packet is a redundancy protocol packet, perform, using the one or more shared resources, at least one lookup operation to determine whether the packet is a first instance packet or a duplicate packet that is to be discarded by the network device, wherein the dual lookup and duplicate discard engine includes a key generator configured to generate a key based on packet information corresponding to a packet, and a shared hash engine configured to generate at least one hash value for performing a lookup for the packet based on the key generated for the packet, wherein the shared hash engine is configured to apply a same hash function to the key regardless of whether the packet is a regular packet or a redundancy protocol packet.

2. The network device of claim 1, wherein the key generator is configured to:

in response to determining that a packet is a regular packet, generate the key to include a destination address from a header of the packet; and in response to determining that a packet is a redundancy protocol packet, generate the key to include a source address from a header of the packet and a sequence number from one of a header of the packet or a trailer of the packet.

3. The network device of claim 1, further comprising a lookup table configured to store i) first entries for storing forwarding information corresponding to the regular packets and ii) second entries for storing duplicate identification information corresponding to the redundancy protocol packets, wherein the dual lookup and duplicate discard engine is configured to perform lookups in the lookup table for both the regular packets and the redundancy protocol packets received by the network device.

4. The network device of claim 3, wherein the lookup table includes i) a first entry storing a correspondence between a destination address in a regular packet and a network interface via which the regular packet is to be transmitted by the network device and ii) a second entry storing a source address and a sequence number uniquely identifying a first instance of a redundancy protocol packet received by the network device.

5. The network device of claim 3, further comprising a cache memory, wherein the dual lookup and duplicate discard engine is configured to store, in the cache memory, duplicate identification information corresponding to first instances of redundancy protocol packets received within a predetermined number of clock cycles by the network device.

6. The network device of claim 5, wherein:

the dual lookup and duplicate discard engine is configured to, in response to determining that a packet is a redundancy protocol packet, perform lookup operations in the cache memory and the lookup table to determine whether an entry that matches a source address and a sequence number obtained from the packet exists in the cache memory or the lookup table, and in response to determining that an entry that matches the source address and the sequence number obtained from the packet exists in either the cache memory or the lookup table, provide, to the network interface processor, an indication that the packet is a duplicate packet that is to be discarded by the network device.

7. The network device of claim 6, wherein the dual lookup and duplicate discard engine is further configured to:

in response to determining that an entry that matches the source address and the sequence number obtained from the packet does not exist in either the cache memory or the lookup table, determine that the packet is a first instance packet, store, in each of the cache memory and the lookup table, duplicate identification information including the source address and the sequence number obtained from the packet, and provide, to the network interface processor, an indication that the packet is to be transmitted via one or more network interfaces among the plurality of network interfaces of the network device.

8. The network device of claim 1, wherein the dual lookup and duplicate discard engine is configured to:

provide, to the network interface processor, forwarding information for a regular packet, the forwarding information including indications of one or more network interfaces via which the regular packet is to be transmitted by the network device; and provide, to the network interface processor, duplicate discard information for a redundancy protocol packet, the duplicate discard information including an indication of whether the redundancy protocol packet is a first instance of the packet to be transmitted by the network device or a duplicate of the packet to be discarded by the network device.

9. The network device of claim 1, wherein the dual lookup and duplicate discard engine includes:

a first channel dedicated to performing lookup operations, in a lookup table, for the redundancy protocol packets; and a second channel for performing lookup operations in the lookup table for the redundancy protocol packets and writing, to the lookup table, duplicate identification information corresponding to first instances of the redundancy protocol packets.

10. A method for processing packets in a network device, the method comprising:

receiving packets via network interfaces among a plurality of network interfaces of the network device;

determining whether respective packets, among the packets, are regular packets or redundancy protocol packets, the redundancy protocol packets conforming to one or more redundancy network protocols that specify transmission of duplicate packets; and selectively processing the packets using a dual lookup and duplicate discard engine of the network device, including i) in response to determining that a first packet, among the packets, is a regular packet, processing the first packet using one or more shared resources to determine one or more network interfaces, among the plurality of network interfaces, via which the first packet is to be transmitted by the network device or ii) in response to determining that a second packet, among the packets, is a redundancy protocol packet, processing the second packet using the one or more shared resources to determine whether the second packet is a first instance packet or a duplicate packet that is to be discarded by the network device, wherein processing the packets using the dual lookup and duplicate discard engine includes generating a first key based on packet information corresponding to the first packet, generating, using a shared hash engine, at least one hash value for performing a lookup for the first packet based on the first key generated for the first packet, including applying a hash function to the first key, generating a second key based on packet information corresponding to the second packet, and generating, using the shared hash engine, at least one hash value for performing a lookup for the second packet based on the second key generated for the second packet, including applying the hash function to the second key.

11. The method of claim 10, wherein processing the packets using the dual lookup and duplicate discard engine includes:

generating the first key for the first packet to include a destination address from a header of the first packet; and generating the second key for the second packet to include a source address from a header of the second packet and a sequence number from one of a header of the second packet or a trailer of the second packet.

12. The method of claim 10, wherein processing the packets using the dual lookup and duplicate discard engine includes performing lookup operations in a lookup table configured to store forwarding information corresponding to regular packets and duplicate identification information corresponding to the redundancy protocol packets.

13. The method of claim 12, wherein performing the lookup operations in the lookup table includes:

in response to determining that the first packet is a regular packet, identifying, in the lookup table, a first entry that stores forwarding information for forwarding the first packet; and in response to determining that the second packet is a redundancy protocol packet, identifying, in the lookup table, a second entry storing duplicate identification information that matches duplicate identification information corresponding to the second packet.

14. The method of claim 13, wherein:

identifying the first entry in the lookup table comprises identifying an entry storing a correspondence between a destination address in the first packet and a network interface via which the first packet is to be transmitted by the network device; and identifying the second entry in the lookup table comprises identifying an entry storing a source address and a sequence number uniquely identifying a first instance of the second packet received by the network device.

15. The method of claim 14, further comprising storing, by the dual lookup and duplicate discard engine in both the lookup table and a cache memory, duplicate identification information corresponding to the first instance of the second packet when the first instance of the second packet is received by the network device.

16. The method of claim 15, wherein processing the second packet using the dual lookup and duplicate discard engine includes:

performing lookup operations in the cache memory and the lookup table to determine whether an entry that matches a source address and a sequence number in the second packet exists in the cache memory or the lookup table; and in response to determining that an entry that matches the source address and the sequence number in the second packet exists in either the cache memory or the lookup table, determining that the packet is a duplicate packet that is to be discarded by the network device.

17. The method of claim 10, wherein processing the packets using the dual lookup and duplicate discard engine includes:

in connection with processing the first packet generating, by the dual lookup and duplicate discard engine, a first response to include forwarding information for the first packet, the forwarding information including indications of one or more network interfaces via which the first packet is to be transmitted by the network device, and providing the first response to a network interface processor of the network device; and in connection with processing the second packet, generating a second response to include duplicate discard information, duplicate discard information including an indication of whether the second packet is a first instance to be transmitted by the network device or a duplicate to be discarded by the network device, and providing the second response to the network interface processor of the network device.

18. The method of claim 10, wherein processing the packets using the dual lookup and duplicate discard engine includes:

using a first channel of the dual lookup and duplicate discard engine to perform lookup operations, in a lookup table, for redundancy protocol packets; and using a second channel of the dual lookup and duplicate discard engine to perform lookup operations in the lookup table for the redundancy protocol packets and writing, to the lookup table, duplicate identification information corresponding to first instances of the redundancy protocol packets.

* * * * *